US011729222B2

(12) United States Patent
Soroush et al.

(10) Patent No.: US 11,729,222 B2
(45) Date of Patent: Aug. 15, 2023

(54) SYSTEM AND METHOD FOR EXTRACTING CONFIGURATION-RELATED INFORMATION FOR REASONING ABOUT THE SECURITY AND FUNCTIONALITY OF A COMPOSED INTERNET OF THINGS SYSTEM

(71) Applicant: Palo Alto Research Center Incorporated, Palo Alto, CA (US)

(72) Inventors: Hamed Soroush, San Jose, CA (US); Milad Asgari Mehrabadi, Irvine, CA (US); Shantanu Rane, Menlo Park, CA (US); Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 388 days.

(21) Appl. No.: 16/918,966

(22) Filed: Jul. 1, 2020

(65) Prior Publication Data
US 2021/0014263 A1  Jan. 14, 2021

Related U.S. Application Data

(60) Provisional application No. 62/873,746, filed on Jul. 12, 2019.

(51) Int. Cl.
*H04L 29/06* (2006.01)
*H04L 9/40* (2022.01)
(Continued)

(52) U.S. Cl.
CPC .......... *H04L 63/205* (2013.01); *G06F 16/252* (2019.01); *G06F 21/577* (2013.01);
(Continued)

(58) Field of Classification Search
CPC . H04L 63/205; H04L 63/1433; G06F 16/252; G06F 21/577; G06F 2221/034;
(Continued)

(56) References Cited

U.S. PATENT DOCUMENTS

| | | | |
|---|---|---|---|
| RE47,757 E * | 12/2019 | Hering | H04W 12/128 |
| 2008/0104665 A1 * | 5/2008 | Naldurg | G06F 21/577 |
| | | | 726/2 |

(Continued)

*Primary Examiner* — Mahfuzur Rahman
(74) *Attorney, Agent, or Firm* — Shun Yao; Yao Legal Services, Inc.

(57) ABSTRACT

Embodiments provide a system and method for extracting configuration-related information for reasoning about the security and functionality of a composed system. During operation, the system determines, by a computing device, information sources associated with hardware and software components of a system, wherein the information sources include at least specification sheets, standard operating procedures, user manuals, and vulnerability databases. The system selects a set of categories of vulnerabilities in a vulnerability database, and ingests the information sources to obtain data in a normalized format. The system extracts, from the ingested information sources, configuration information, vulnerability information, dependency information, and functionality requirements to create a model for the system. The system displays, on a screen of a user device, one or more interactive elements which allow the user to view or select the information sources and the categories of vulnerabilities, initiate ingesting the information sources, and view the extracted configuration information.

18 Claims, 8 Drawing Sheets

(51) Int. Cl.
*G06F 21/57*         (2013.01)
*G06F 16/25*         (2019.01)
*G06N 5/04*          (2023.01)
*G06N 3/04*          (2023.01)

(52) U.S. Cl.
CPC ............... *G06N 3/04* (2013.01); *G06N 5/04* (2013.01); *H04L 63/1433* (2013.01); *G06F 2221/034* (2013.01)

(58) Field of Classification Search
CPC . G06F 21/57; G06N 3/04; G06N 5/04; G06N 5/022
See application file for complete search history.

(56) References Cited

U.S. PATENT DOCUMENTS

| | | | |
|---|---|---|---|
| 2017/0034023 A1* | 2/2017 | Nickolov | H04L 43/0817 |
| 2019/0098039 A1* | 3/2019 | Gates | G06F 21/6245 |

\* cited by examiner

| CWE ID 302 | NAME 304 | NVD SHORT DESCRIPTION 306 |
|---|---|---|
| CWE-16 | CONFIGURATION | Weaknesses in this category are typically introduced during the configuration of the software. |
| CWE-255 | CREDENTIAL MANAGEMENT | Weaknesses in this category are related to the management of credentials. |
| CWE-264 | PERMISSIONS, PRIVILEGES, AND ACCESS CONTROLS | Weaknesses in this category are related to the management of permissions, privileges, and other security features that are used to perform access control. |
| CWE-275 | PERMISSION ISSUES | Weaknesses in this category are related to improper assignment or handling or permissions. |
| CWE-284 | CREDENTIAL MANAGEMENT | The software does not restrict or incorrectly restricts access to a resource from an unauthorized actor. |
| CWE-285 | IMPROPER AUTHORIZATION | The software does not perform or incorrectly performs an authorization check when an actor attempts to access a resource or perform an action. |
| CWE-552 | FILES/FOLDERS ACCESSIBLE TO EXTERNAL PARTIES | Files or directories are accessible in the environment that should not be. |
| CWE-665 | IMPROPER INITIALIZATION | The software does not initialize or incorrectly initializes a resource, which might leave the resource in an unexpected state when it is accessed or used. |
| CWE-769 | UNCONTROLLED FILE DESCRIPTOR CONSUMPTION | The software can be influenced by an attacker to open more files than are supported by the system. |

FIG. 3

| TYPE-2 VULNERABILITY 402 | TESTBED COMPONENT 404 |
|---|---|
| ENABLING PACKET FORWARDING BY DEFAULT | OPENWRT FIREWALL |
| ALLOWING ALL PROTOCOLS FROM WAN TO LAN | OPENWRT FIREWALL |
| ENABLING PACKET FORWARDING BY DEFAULT | OPENWRT FIREWALL |
| DISABLING TAMPER SIREN | SECURITY HUB |
| SETTING ALARM DURATION TO ZERO | SECURITY HUB |
| SILENCING ALL GATEWAY SOUNDS | SECURITY HUB |
| USING DEFAULT OR NO PASSWORD | OPEN SPRINKLER |
| BYPASSING PASSWORD CHECK | OPEN SPRINKLER |
| ALLOWING APP INSTALLATION FROM UNKNOWN SOURCES | TABLET |
| ENABLING DDNS FOR A NORMAL IoT DEVICE | IP CAMERA |
| DISABLING WATERMARK | IP CAMERA |
| HAVING SHORT WATERMARK CHARACTERS | IP CAMERA |
| DISABLING LOGIN FAILURE MONITORING | IP CAMERA |
| DISABLING NETWORK DISCONNECT MONITORING | IP CAMERA |
| DISABLING IP CONFLICT MONITORING | IP CAMERA |
| DISABLING ANTI-LOCKOUT RULE | PFSENSE FIREWALL |

FIG. 4A

| TYPE-3 VULNERABILITY 452 | TESTBED COMPONENT 454 |
|---|---|
| HAVING (A POTENTIALLY UNNECESSARY FIREWALL RULE ENABLED (IN A DEFAULT DENY SETTING) | PFSENSE FIREWALL |
| DISABLING PROTECTION AGAINST DNS REBINDING ATTACKS | PFSENSE FIREWALL |
| DISABLING LOGGING FOR SUCCESSFUL LOG-IN ATTEMPTS | PFSENSE FIREWALL |
| ALLOWING LOGIN BY-PASS | PFSENSE FIREWALL |
| DISABLING PROTECTION AGAINST HTTP REFERER ATTACKS | PFSENSE FIREWALL |
| NOT USING HTTPS | PFSENSE FIREWALL |
| DISABLING LOGGING | OPEN SPRINKLER |
| HAVING HIGH LOGIN FAILURE THRESHOLD | IP CAMERA |
| DISABLING ILLEGAL ACCESS EMAIL ALERTS | IP CAMERA |
| HAVING LONG ILLEGAL ACCESS ALARM RELAYOUT DELAY | IP CAMERA |
| DISABLING ILLEGAL ACCESS ALARM RELAYOUT | IP CAMERA |
| DISABLING REMOTELY LOCATING THE DEVICE | TABLET |
| USING NO API PASSWORD | HOME ASSISTANT |

SYSTEM AND METHOD FOR EXTRACTING CONFIGURATION-RELATED INFORMATION FOR REASONING ABOUT THE SECURITY AND FUNCTIONALITY OF A COMPOSED INTERNET OF THINGS SYSTEM

RELATED APPLICATIONS

This application claims the benefit of:
U.S. Provisional Application No. 62/873,746, entitled "System and Method for Improving the Security Versus Functionality Tradeoff of a Composed Internet of Things System," by inventors Hamed Soroush and Shantanu Rane, filed 12 Jul. 2019, which subject matter is related to the subject matter in
U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 (hereinafter "U.S. patent application Ser. No. 16/219,774"), which application claims the benefit of
U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018;
the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security versus functionality tradeoff. More specifically, this disclosure is related to a system and method for extracting configuration-related information for reasoning about the security and functionality of a composed Internet of Things (IoT) system.

Related Art

As cybersystems become increasingly complex and connected, configuration analytics may play a critical role in the correct and secure operation of cybersystems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, these solutions lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they provide functional dependencies between the interconnected system components or devices.

SUMMARY

The embodiments described herein provide a system and method for extracting configuration-related information for reasoning about the security and functionality of a composed system. During operation, the system determines, by a computing device, information sources associated with hardware and software components of a system, wherein the information sources include at least specification sheets, standard operating procedures, user manuals, and vulnerability databases. The system selects a set of categories of vulnerabilities in a vulnerability database, and ingests the information sources to obtain data in a normalized format. The system extracts, from the ingested information sources, configuration information, vulnerability information, dependency information, and functionality (or functional) requirements to create a model for the system. The system displays, on a screen of a user device, one or more interactive elements which allow the user to view or select the information sources and the categories of vulnerabilities, initiate ingesting the information sources, and view the extracted configuration information.

In some embodiments, the extracted configuration information includes, for a configuration parameter of a component of the system, one or more of: a name of the configuration parameter; a data type associated with the configuration parameter; a default value associated with the configuration parameter; a current value associated with the configuration parameter; a range of possible values associated with the configuration parameter; and a natural language text description associated with the configuration parameter.

In some embodiments, the system analyzes the natural language text description associated with the configuration parameter, which involves: determining, based on a relevancy metric, which portions of the natural language text description are relevant; and determining from the relevant portions further constraints on the configuration parameters, wherein the constraints include one or more of: equality constraints; inequality constraints; membership in a set; and ranges for the configuration parameter.

In some embodiments, the extracted vulnerability information includes one or more of: a first set of software vulnerabilities obtained from the vulnerability databases, wherein a category of vulnerabilities in the vulnerability database is associated with a type and a name, and wherein the selected categories are associated with configuration-related vulnerabilities; a second set of security bad practices based on expert knowledge or specified by user input; and a third set of security not-best practices based on expert knowledge or specified by user input.

In some embodiments, the first set of software vulnerabilities include Common Vulnerability and Exposure (CVE) entries from the National Vulnerability Database, and a CVE entry of the first set is associated with a Common Weakness Enumeration Specification (CWE) identifier and is further categorized as a configuration-related vulnerability.

In some embodiments, the extracted dependency information includes one or more of: input from the user or another user; and a third party tool for discovering service dependencies based on observation of network traffic and analysis of call graph.

In some embodiments, the functionality requirements include one or more of: parameter range constraints specifying legitimate ranges of values which can be assigned to a respective configuration parameter, wherein the parameter range constraints are obtained from the extracted configuration information; and functionality and performance requirements ingested based on input from the user via a graphical interface on the screen of the user device.

In some embodiments, the composed system comprises an Internet of Things (IoT) system which comprises a configuration graph, an attack graph, and a dependency graph. The extracted configuration information is used to generate the configuration graph. The extracted vulnerability information is used to generate the vulnerability graph. The extracted dependency information is used to generate the dependency graph.

In some embodiments, the system includes a setting which prioritizes functionality or security. The setting is passed to a reasoning module to determine whether a set of constraints associated with one or more of the components is mutually compatible.

In some embodiments, the setting comprises a weighted value for a subset of one of more components, wherein the weighted value is assigned by the user or based on a default or other system setting.

In some embodiments, the one or more displayed interactive elements further allow the user to view one or more of: the extracted vulnerability information; the extracted dependency information; and the extracted functionality requirements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which extracts configuration-related information for reasoning about the security and functionality of a composed system. This extraction can be part of a data ingestion module or framework, one of four modules of a larger system described in U.S. patent application Ser. No. 16/219, 774. This "overall system" is referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

The overall system can model a composed system using a multi-layer graph which includes: a dependency subgraph that captures the functional relationships among system components; a configuration subgraph that accounts for relationships among configuration parameters within and across components, and an attack or vulnerability subgraph modeling the system's vulnerabilities and their use in multi-step attacks.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., by using a Satisfiability Modulo Theory (SMT) solver to express the complex relationships among the configuration parameters as constraints in a security optimization problem.

The overall system can be implemented with a scalable pipeline, which can: ingest system requirements, configuration files, software documentation and various types of configuration vulnerabilities (data ingestion framework); build a queryable, graph-based representation of the relationships between configuration vulnerabilities and attack scenarios, configuration parameters and system components (modeling framework); provide an application programming interface (API) to perform a quantitative, comparative analysis of the security impact of configuration settings (reasoning framework); automatically construct a constraint satisfaction problem based on the model and utilizes Z3 SMT solver to solve for optimal parameter values (reasoning framework); and provide human-readable evidence about the optimality of the selected configuration (evidence generation framework).

In the embodiments described herein, the overall system can determine the significance of security misconfiguration vulnerabilities by analyzing data from vulnerability databases (e.g., the National Vulnerability Database (NVD)) and IoT search engines (e.g., Shodan), as described below in relation to FIGS. 2A and 2B. The data ingestion module can determine various data or information sources associated with individual hardware and software components of a system (e.g., a composed IoT system). For example, the information sources can include configuration files, requirements, and documentation (e.g., as found in specification sheets, standard operating procedures, and user manuals) as well as vulnerability information (e.g., as obtained from vulnerability databases). The data ingestion module can select a set of categories of vulnerabilities of a vulnerability database (e.g., NVD), where the selected categories can be associated with configuration-related vulnerabilities, as described below in relation to FIG. 3.

The data ingestion module can ingest the information sources (which may be associated with many different data formats) to obtain data in a normalized data format. The data ingestion module can subsequently extract, from the ingested information sources, configuration information, vulnerability information, dependency information, and functionality requirements to create or generate a model for the system (e.g., the IoT system). Subsequently, the data ingestion module can display, on a screen of a user device, the extracted information, and can also display one or more interactive elements which allow a user to view or select the information sources and the categories of vulnerabilities, initiate ingesting the information sources, and view the extracted configuration information. An exemplary environment depicting operations and functions of the data ingestion module is described below in relation to FIG. 5.

The generated model of the system can represent, e.g., the composed IoT system, and can include three subgraphs (a configuration graph, an attack graph, and a dependency graph), as described in U.S. patent application Ser. No. 16/219,774. The extracted configuration information can be used to generate the configuration graph; the extracted vulnerability information can be used to generate the vulnerability graph; and the extracted dependency information can be used to generate the dependency graph.

The terms "framework" and "module" are used interchangeably in this disclosure, and refer to a component or unit of the "overall system" or "SCIBORG." A framework or module can be associated with various operations and functions, as described herein.

The term "overall system" refers to SCIBORG, which includes the four frameworks (i.e., data ingestion framework, modeling framework, reasoning framework, and evidence generation framework). The terms "data ingestion module" and "data ingestion framework" are used interchangeably in this disclosure, and refer to one of the four frameworks of the overall system or SCIBORG. The term "system" can refer to the overall system or the data ingestion module/framework.

The terms "vulnerability graph" and "attack" graph are used interchangeably in this disclosure, and refer to one of the three subgraphs of the generated multi-layer graph.

High-Level Overview of System with Four Frameworks/Modules

Figure 1:
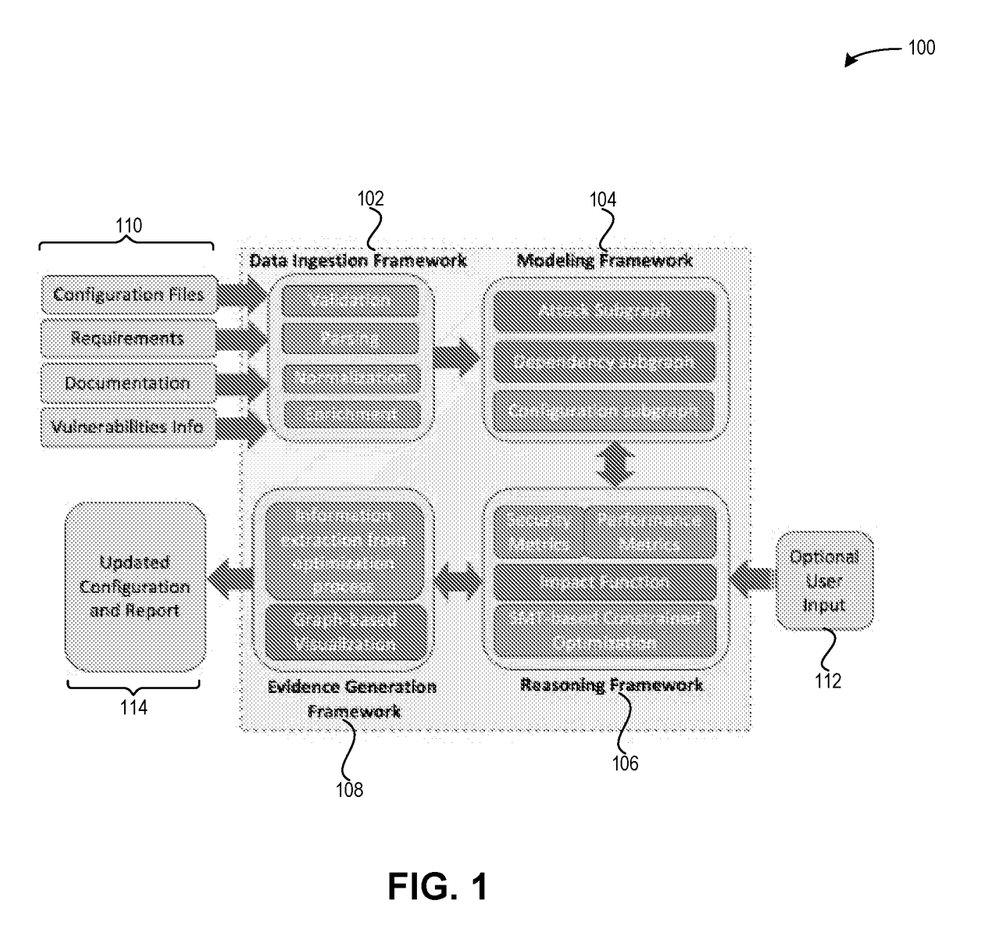
FIG. 1 illustrates an exemplary environment for facilitating an improvement in the security versus functionality tradeoff of a composed system, in accordance with an embodiment of the present application.

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with hardware and software components of a system, and can further receive data from those information sources as input (e.g., input 110 which can include configuration files, functional requirements, documentation, and vulnerabilities information). A detailed flow of the operations performed by data ingestion framework 102 is described below in relation to FIGS. 5 and 6. Reasoning framework 106 can receive an optional user input 112, and evidence generation framework 108 can produce as output an updated configuration and report 114.

Detailed Description of Data Ingestion Framework

As described above, the data ingestion framework can ingest data from various information sources, including specification sheets, standard operating procedures, user manuals, and vulnerability databases. Depending on the type of information, the system component, and the manufacturer or vendor associated with a given hardware or software component, the data obtained from these information sources may be in different data formats, e.g., XML, HTML/CSS, JSON, and natural language. The system can perform a semi-automatic process for data ingestion, e.g., by using customized parsers for some components. In some embodiments, the system can use software tools such as Apache NiFi to ingest the information and convert the information to a normalized format. The system can also provide a user interface which allows a user to view or select the information sources. The user interface can also allow the user to initiate ingestion of the data sources and to view the extracted configuration information, as described below in relation to FIG. 5. The user interface can further allow a user to visually create ingestion data flows and may come equipped with mechanisms for components of interest (e.g., PFSense Firewall), which flows may be implemented by using Apache NiFi.

The system can ingest and extract various types of information, including: configuration information; vulnerability information; dependency information; and functional requirements.

—Ingesting Configuration Information

The described data ingestion module can extract configuration information for a configuration parameter of a system component. Exemplary configuration information can include one or more of: a name of the configuration parameter; a data type associated with the configuration parameter; a default value associated with the configuration parameter; a current value associated with the configuration parameter; a range of possible values associated with the configuration parameter; and a natural language text description associated with the configuration parameter (e.g., free-form text descriptions).

The system can also analyze the natural language text description associated with the configuration parameter. For example, the system can obtain a relevancy metric. Based on the relevancy metric, the system can determine which portions of the natural language text description are relevant. The system can also determine from the relevant portions further constraints on the configuration parameters. The constraints can include one or more of: equality constraints; inequality constraints; membership in a set; and ranges for the configuration parameter.

The system can use the extracted configuration information to construct the configuration graph in the downstream modeling framework.

—Ingesting Vulnerability Information

Type-1 Vulnerability

The system can distinguish between three types of vulnerabilities. A first type ("Type-1") includes a first set of software vulnerabilities obtained from the vulnerability databases. These software vulnerabilities can also be identified by vulnerability scanners.

One vulnerability database is NVD, and the ingested data can include known vulnerabilities in system components based on the Common Vulnerability and Exposure (CVE) identifier (ID), various CVSS v2 and v3 scores, the access complexity, the Common Weakness Enumeration Specification (CWE) category, and the natural language text description. The system can also ingest information about the privileges that an attacker may gain by exploiting a given vulnerability. The system can use this exploitable privileges information, in combination with the access complexity, to construct the attack graphs in the downstream modeling framework.

Figure 2A:
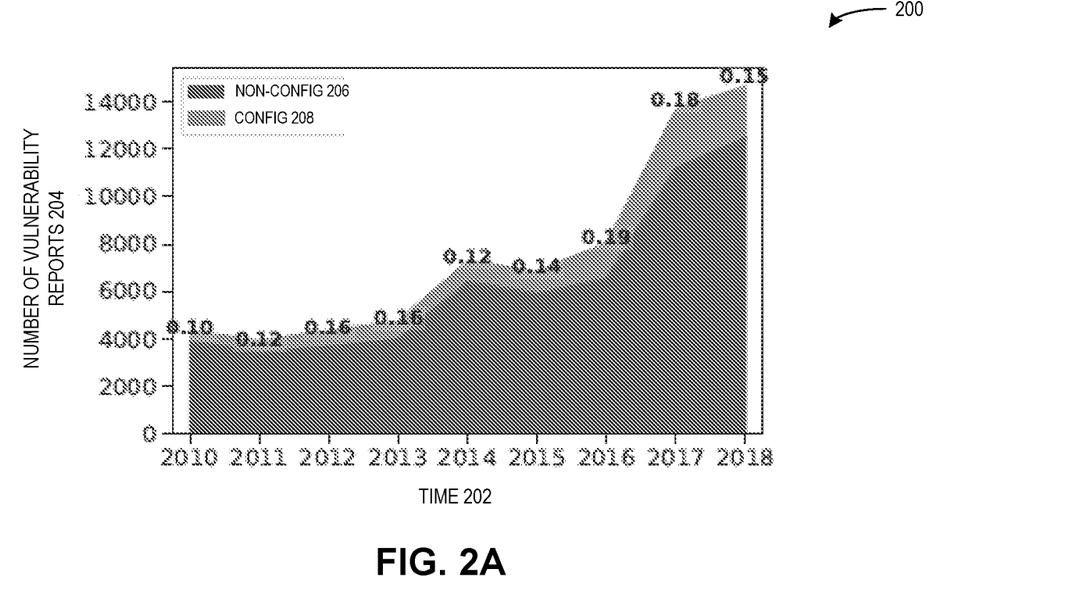
FIG. 2A illustrates an exemplary graph depicting the number of configuration versus non-configuration vulnerability reports over time, in accordance with an embodiment of the present application.

FIG. 2A illustrates an exemplary graph 200 depicting the number of configuration versus non-configuration vulnerability reports over time, in accordance with an embodiment of the present application. Graph 200 can include an x-axis of time 202 (marked in units of years) and a y-axis of number of vulnerability reports 204 (marked in units of 2,000). The configuration-related ("config") reports are depicted in an orange color (in the index as config 208 and in graph 200), while the non-configuration-related ("non-config") reports are depicted in a blue color (in the index as non-config 206 and in graph 200). Graph 200 indicates how the number of reported vulnerabilities has changed over the analysis period along with the fraction of configuration-related CVEs for each year.

Figure 2B:
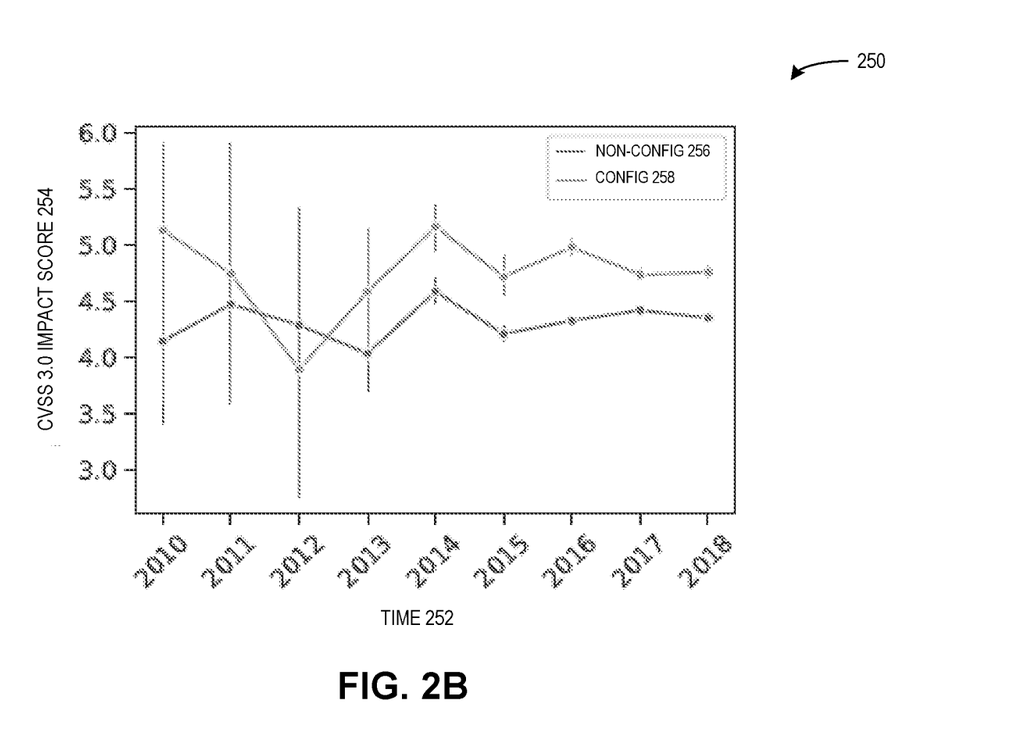
FIG. 2B illustrates an exemplary graph depicting the evolution of the Common Vulnerability Scoring System (CVSS) version 3.0 impact score for configuration and non-configuration vulnerabilities over time, in accordance with an embodiment of the present application.

FIG. 2B illustrates an exemplary graph 250 depicting the evolution of the CVSS 3.0 impact score for configuration and non-configuration vulnerabilities over time, in accordance with an embodiment of the present application. Graph 250 can include an x-axis of time 252 (marked in units of years) and a y-axis of the CVSS 3.0 impact score 254 (marked in units of 0.5). The configuration-related ("config") scores are depicted in an orange color (in the index as config 258 and in graph 250), while the non-configuration-related ("non-config") reports are depicted in a blue color (in the index as non-config 256 and in graph 250).

Graph 250 indicates the evolution of the impact score derived from the CVSS 3.0 for config and non-config vulnerabilities over the analysis period. Graph 250 depicts that the impact score of recent configuration vulnerabilities has lower variance, which can indicate a higher confidence in their impact. Configuration-related vulnerabilities may thus have a higher impact than non-config-related vulnerabilities for both CVSS 2.0 and 3.0.

The system can also retrieve or obtain data from an IoT search engine or a vulnerability scanner, such as Shodan. Shodan is a search engine for characterizing Internet facing IoT devices and services. Shodan can utilize custom crawlers that scan the Internet regularly and store information about hosts, such as potential device tag name(s), product names, Internet Protocol (IP) addresses, vulnerabilities, crawler types, and a timestamp of the scan. Shodan can provide this longitudinal information via a graphical user interface and an API.

The system can focus on NVD-based vulnerabilities, by identifying the type of each vulnerability based on a lookup of its CWE label from NVD and by labeling configuration-related and non-configuration-related vulnerabilities based on the table depicted below in FIG. 3. Despite their high impact, configuration vulnerabilities may linger for an unacceptable amount of time in ICS and IoT systems, which further emphasizes the need for systems and solutions that can discover and remediate this unacceptably long amount of lingering time.

Figure 3:
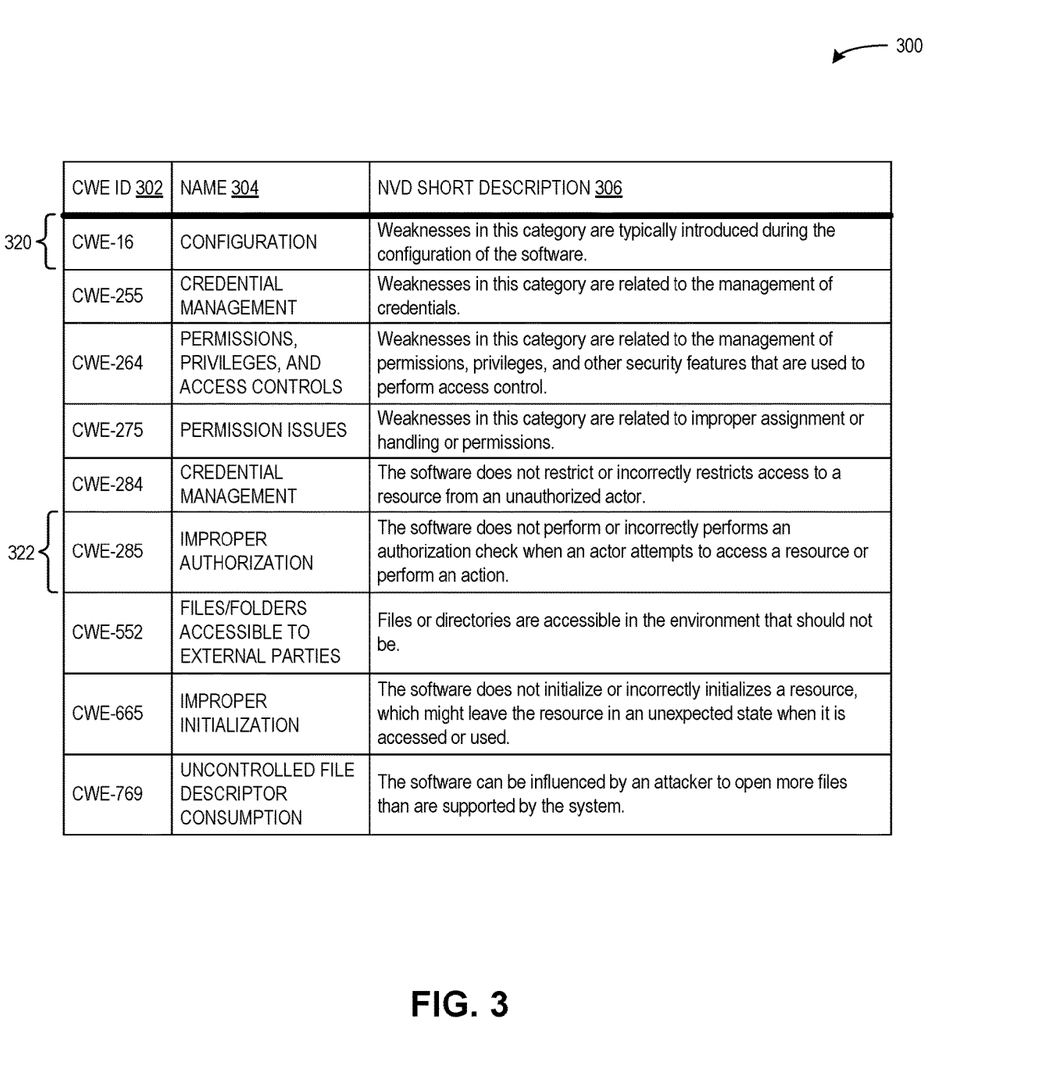
FIG. 3 depicts a table of configuration-related vulnerabilities identified from the National Vulnerability Database (NVD), including a label, name, and short description for each configured-related vulnerability, in accordance with an embodiment of the present application.

FIG. 3 depicts a table 300 of configuration-related vulnerabilities identified from the National Vulnerability Database (NVD), including a label, name, and short description for each configured-related vulnerability, in accordance with an embodiment of the present application. Table 300 can include nine rows or entries, with columns which include the following features: a CWE identifier 302; a name 304; and an NVD short description 306. For example, an entry 320 corresponds to a CWE ID of CWE-16, with a name of "Configuration" and a description of "Weaknesses in this category are typically introduced during the configuration of the software." Entry 320 is the only category of vulnerabilities which is specifically or explicitly categorized in NVD as "Configuration."

The remaining entries are additional entries which are selected by a user or administrator based on observation and historical analysis (e.g., as in FIGS. 2A and 2B), and indicated as configuration-related vulnerabilities, despite not being explicitly categorized as "Configuration" vulnerabilities. For example, an entry 322 corresponds to a CWE ID of CWE-285, with a name of "Improper Authorization" and a description of "The software does not perform or incorrectly performs an authorization check when an actor attempts to access a resource or perform an action." Entry 322, along with the other remaining listed entries (not including entry 320) (for a total of eight additional categories), is not specifically categorized as a "Configuration" vulnerability. However, by selecting these nine categories as vulnerabilities and identifying them as configuration-related vulnerabilities, the system can provide a more efficient and accurate analysis of security configurations relating to the IoT system. As a result, the system can cover more instances of vulnerabilities and adjust the overall system components and configuration parameters as needed.

Type-2 and Type-3 Vulnerabilities

Figure 4A:
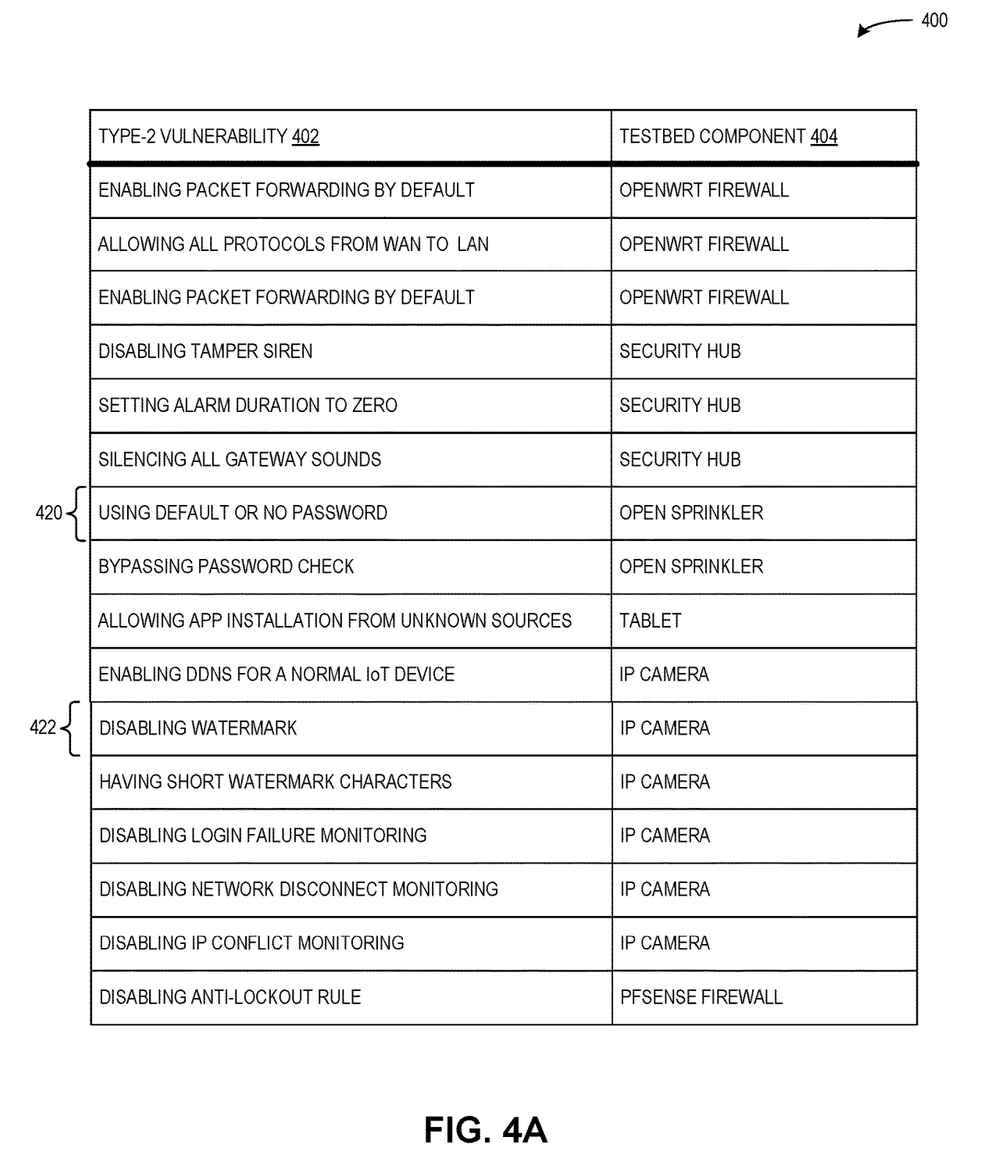
FIG. 4A depicts a table of Type-2 vulnerabilities associated with bad security practices, in accordance with an embodiment of the present application.

A second type ("Type-2") of extracted configuration information can include a set of security bad practices based on expert knowledge or specified by user input, as depicted in FIG. 4A.

FIG. 4A depicts a table 400 of vulnerabilities associated with bad security practices, in accordance with an embodiment of the present application. Entries in table 400 can include a description of the Type-2 Vulnerability 402 and a corresponding testbed component 404 on which the Type-2 Vulnerability was tested. Examples of a bad security practice can include, inter alia, using a default or no password (as indicated in an entry 420) and disabling a watermark (as indicated in an entry 422).

Figure 4B:
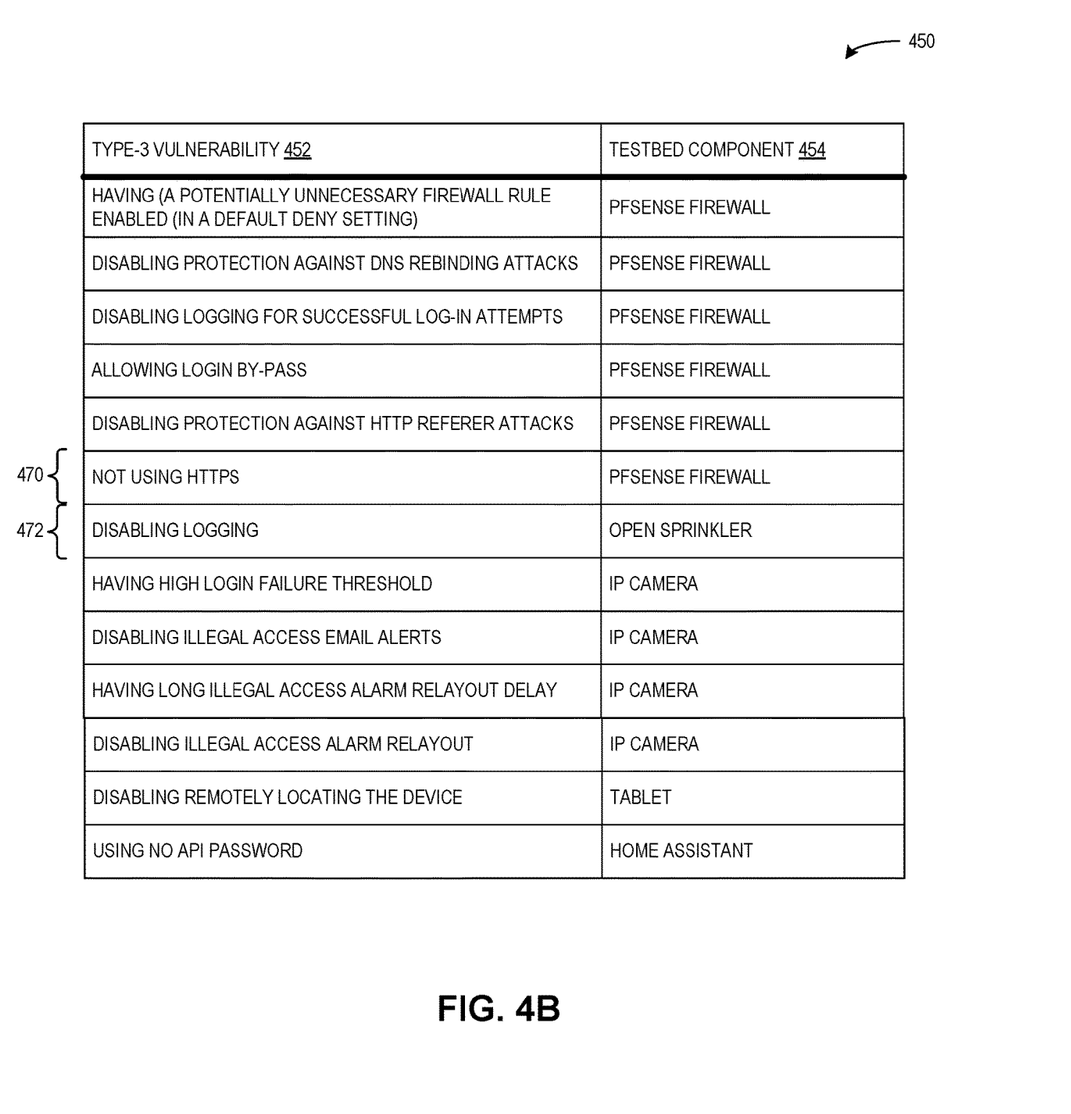
FIG. 4B depicts a table of Type-3 vulnerabilities associated with not-best security practices, in accordance with an embodiment of the present application.

A third type ("Type-3") of extracted configuration information can include a set of security not-best practices based on expert knowledge or specified by user input, as depicted in FIG. 4B. A "not-best" practice may not necessarily be a bad practice; it may instead be a rule created or determined by an expert based on observed experience or historical data. Thus, a not-best practice related to a vulnerability may be a practice which is not truly a bad practice, but for which there exists a better practice.

FIG. 4B depicts a table 450 of vulnerabilities associated with not-best security practices, in accordance with an embodiment of the present application. Entries in table 450 can include a description of the Type-3 Vulnerability 452 and a corresponding testbed component 454 on which the Type-3 Vulnerability was tested. Examples of not-best security practices can include, inter alia, not using https (as indicated in an entry 470) and disabling logging (as indicated in an entry 472).

The system can include a pluggable interface which allows users to define Type-2 and Type 3 vulnerabilities on a per-component basis, e.g., via a graphical interface on a display screen of a user device. The Type-2 and Type 3 vulnerabilities may be provided by, e.g., domain experts in IoT security, and may be represented in machine readable data formats or in natural language. The system can use the Type-2 and Type-3 vulnerabilities (i.e., the security bad practices and the security not-best practices) to construct the attack graphs in the downstream modeling framework.

—Ingesting Dependency Information

The system can extract information about functional dependencies between components from two different sources. A first source can involve direct user input, similar to ingestion of Type-2 and Type-3 vulnerabilities. An example of such a first source can include an entity in charge of the design and commissioning of the system. A second source can involve third-party tools (e.g., NSDMiner) for discovering service dependencies through traffic observation and call graph analysis. The system can use the extracted dependency information to construct the dependency subgraph in the downstream modeling framework.

—Ingesting Functionality Requirements

The system can distinguish between two classes of functionality requirements. The first class is parameter range constraints specifying legitimate ranges of values that can be assigned to configuration parameters. These parameter range constraints can be obtained from the extracted configuration information, as described above. The second class is functionality and performance requirements, ingested from user input via a graphical interface displayed on the screen of the user device. The system can model such requirements as constraints in the configuration space and can further allow users to specify the constraints using ingested parameter names as variables. The system specify these constraints in a Satisfiability Modulo Theories Library (SMT-LIB) 2.09-compliant manner for efficient reasoning by the downstream reasoning module.

Exemplary Environment for Extracting Configuration-Related Information

Figure 5:
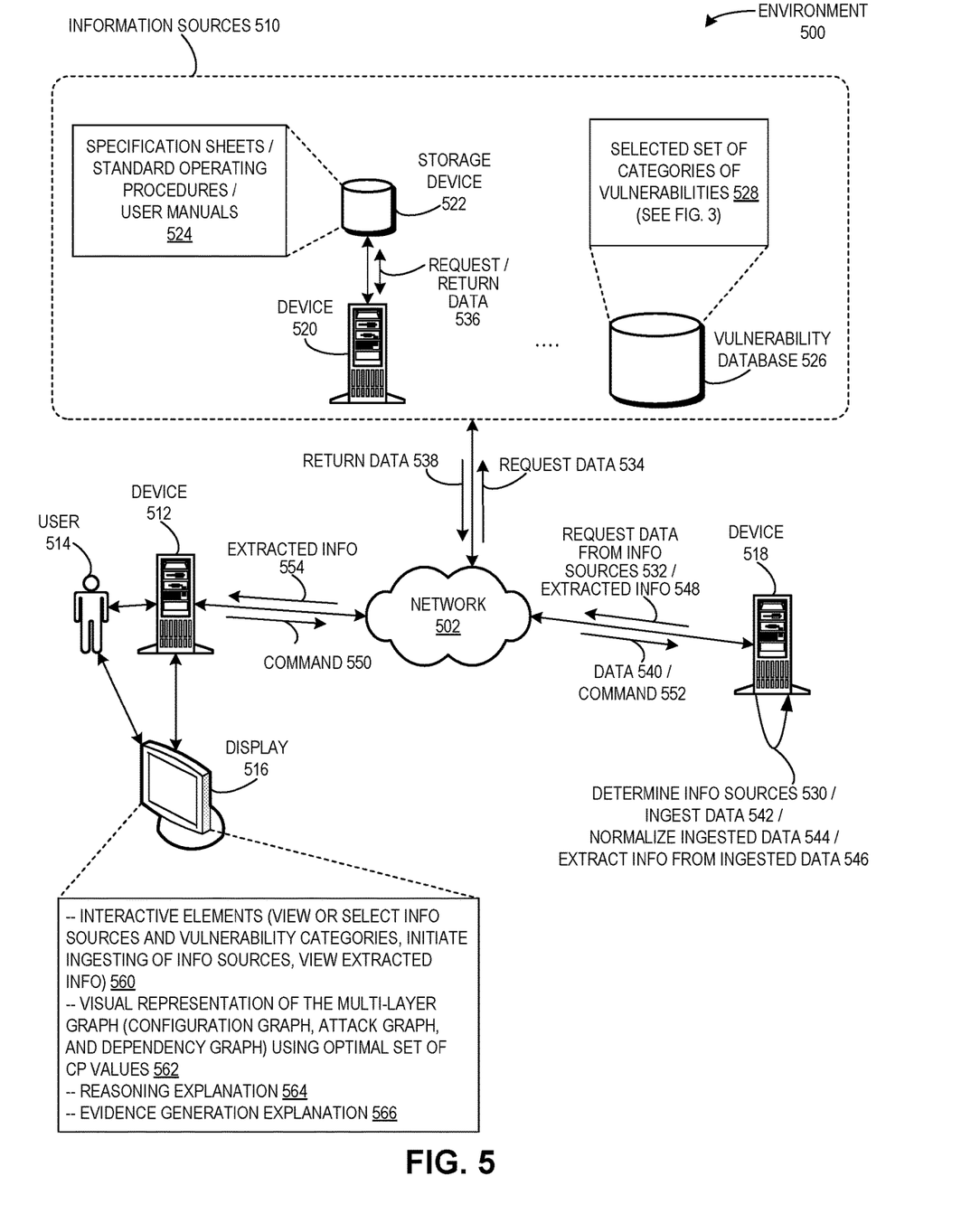
FIG. 5 depicts an exemplary environment for extracting configuration-related information and facilitating an improvement in the security versus functionality tradeoff of a composed system, in accordance with an embodiment of the present application.

FIG. 5 depicts an exemplary environment 500 for extracting configuration-related information and facilitating an improvement in the security versus functionality tradeoff of a composed system, in accordance with an embodiment of the present application. Environment 500 can include: a device 512, an associated user 514, and an associated display 516; information sources 510; and a device 518. Information sources 510 can include a plurality of devices and data stored in the plurality of devices, e.g., a device 520 with an associated storage device 522 and a vulnerability database 526 (e.g., NVD). Information sources 510 can also include IoT search engines, such as Shodan (not shown). Devices 512 and 518 can communicate with each other and with devices associated with information sources 510 (e.g., device 520 and vulnerability database 526) via a network 502. Storage device 522 can include, e.g., specification sheets/standard operating procedures/user manuals 524. Vulnerability database 526 can include vulnerabilities which are organized based on a category of vulnerability, and can also include a selected set of categories of vulnerabilities 528, as described above in relation to FIG. 3. Device 518 can be a server, a computing device, or any device which can perform the functions described herein.

During operation, device 518 can determine information sources from which to retrieve data (determine information sources 530 function) and request data from the information sources (via a request data from information sources 532 communication). The request can be sent to the devices of information sources 510 via network 502 (as a request data 534). As an example, device 520 can receive the request, and retrieve specification sheets/standard operating procedures/ user manuals 524 from storage device 522 (via a request/ return data 536 communication). The selected set of categories of vulnerabilities 528 can also be retrieved from vulnerability database 526. The retrieved data can be sent in a return data 538 communication via network 502 to device 518.

Device 518 can receive the requested data (as data 540), and perform the following operations or functions. Device 518 can perform an ingest data 542 function, a normalize ingested data 544 function, and an extract information from ingested data 546 function, as described herein. Device 518 can return the extracted information (as extracted information 548) to, e.g., a requesting host or client or user.

In some embodiments, device 518 can perform the above-described operations (beginning from function 530) in response to a command received from device 512 (or user 514 via display 516 associated with device 512). That is, device 512 can send a command 550 to device 518 via network 502. Upon receiving command 550 (as a command 552), device 518 can perform function 530 and the system may also perform the subsequent functions described herein (e.g., functions 532, 534, 536, 538, 540, 542, 544, 546, and 548), and send the extracted information back to device 512 (as extracted information 554). Device 512 can display on the screen of display 516 at least: interactive elements (view or select information sources and vulnerability categories, initiate ingesting of information sources, view extracted information) 560; a visual representation of the multi-layer graph (configuration graph, attack graph, and dependency graph) using an optimal set of configuration parameter values 562; a reasoning explanation 564; and an evidence generation explanation 566.

Thus, environment 500 depicts the data ingestion framework, which includes ingesting data from multiple sources and using the identified configuration-related vulnerabilities of FIG. 3. The data ingestion framework can also perform natural language processing, as described above. The data ingestion framework can also use expert knowledge, e.g., to determine the Type-2 security bad practices and the Type-3 security not-best practices, as depicted above in relation to, respectively, FIGS. 4A and 4B. In outputting the extracted data to the modeling framework, the system can also output a setting, which indicates a priority of either functionality or security. The setting can be set by a user or configured by the system or set at a default value, and can be passed downstream to the reasoning module. The setting can also be a weighted value which indicates a ratio or percentage of the relative importance of functionality versus security for the overall system, or one or more components of the system (e.g., as a plurality, group, or set of components).

Figure 6:
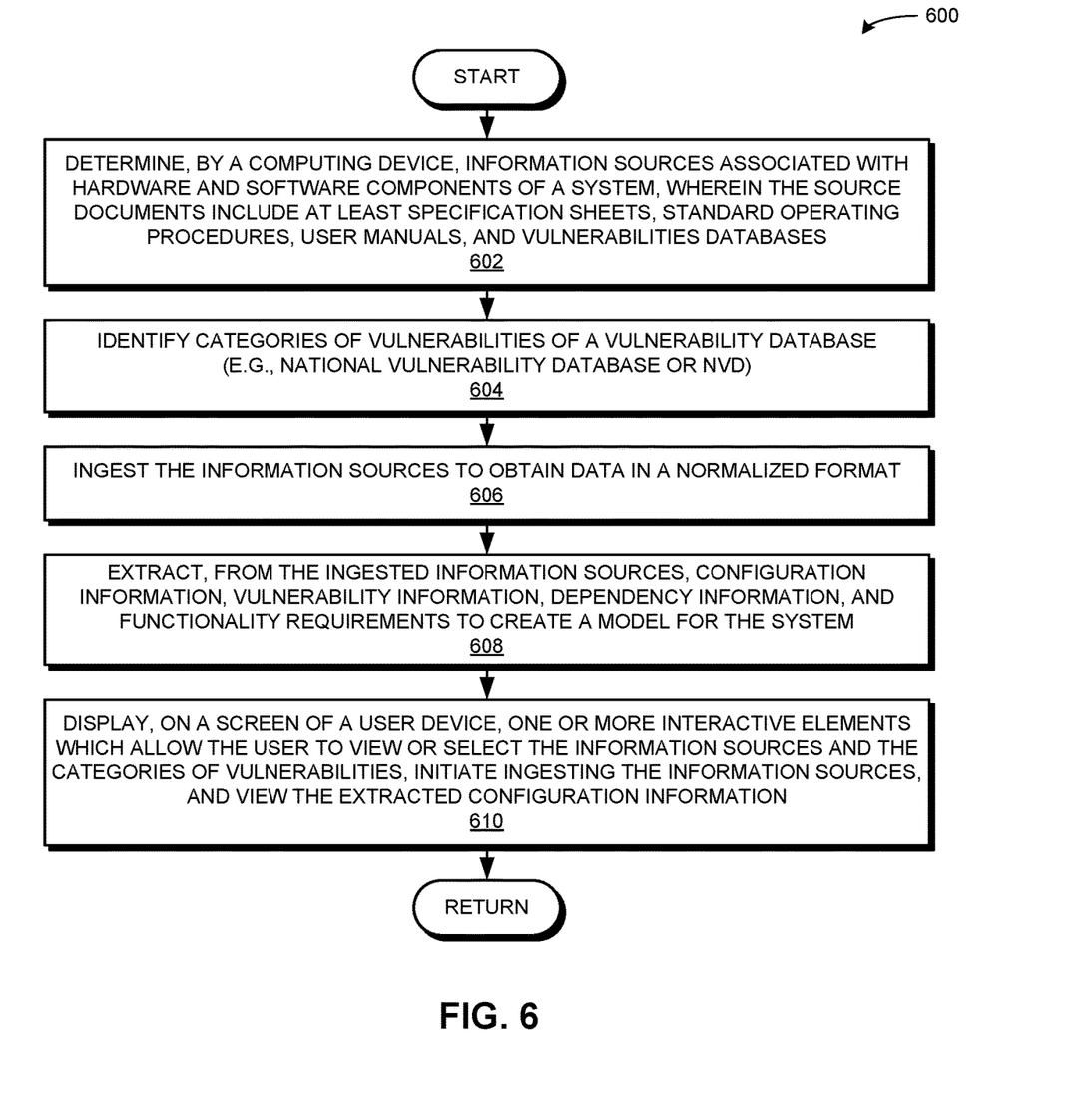
FIG. 6 presents a flow chart illustrating a method for extracting configuration-related information for reasoning about the security and functionality of a composed system, in accordance with an embodiment of the present application.

Exemplary Method for Extracting Configuration-Related Information for Reasoning about Security and Functionality of a Composed System FIG. 6 presents a flow chart 600 illustrating a method for extracting configuration-related information for reasoning about the security and functionality of a composed system, in accordance with an embodiment of the present application. During operation, the system determines, by a computing device, information sources associated with hardware and software components of a system, wherein the information sources include at least specification sheets, standard operating procedures, user manuals, and vulnerability databases (operation 602). The system selects a set of categories of vulnerabilities in a vulnerability database (operation 604). The system ingests the information sources to obtain data in a normalized format (operation 606). The system extracts, from the ingested information sources, configuration information, vulnerability information, dependency information, and functionality requirements to create a model for the system (operation 608). The system displays, on a screen of a user device, one or more interactive elements which allow the user to view or select the information sources and the categories of vulnerabilities, initiate ingesting the information sources, and view the extracted configuration information (operation 610). The system can transmit the extracted information to the modeling framework.

No Known Approaches for the Described Functions/Embodiments; Improvements to Functioning of Computer; Improvements to Technical Fields There are currently no known systems or approaches for achieving or performing the above-described functions or embodiments. While current approaches may provide information about security vulnerabilities present in the configurations of individual components of a composed system, there is currently no known system or approach which provides a way to optimize the configuration so as to improve the overall security/functionality balance of the entire system. Specifically, there is currently no established way to extract configuration parameter values and normalize them for ingestion into the configuration graph.

Given a composed system (such as an IoT system), the embodiments described herein can optimize the configuration of the system components by leveraging the complex relationships among the configuration parameters of the individual system components, which can result in improving the overall security and functionality balance of the entire system. Furthermore, the embodiments described herein provide an improvement over the existing state of the art in the computer technology field of providing security for a system of networked components, and also for optimizing the provided security.

The disclosed system includes a system of networked components (e.g., a composed system which is an IoT system), where each component may be a computing device with different configuration parameters and which may interact differently with the other networked components (or computing devices). Each component may also have different security and functionality parameters. The disclosed system is thus directed to a solution which is both necessarily rooted in computer technology and provides a specific implementation of a solution to a problem in the software arts. Furthermore, the disclosed system can enhance the functioning of the computer system itself, because optimizing the configuration of the system components can improve the balance between the security and the functionality of the overall composed system, which necessarily enhances the functioning of each individual networked component in the overall system. By providing a more secure system which is less prone to attack, the described embodiments can thus enhance the functioning of the computer system itself (as well as the networked components of the composed system), in terms of security, performance, and efficiency.

Furthermore, the described embodiments may be integrated into many different practical applications, e.g., used in many technical fields and for many different applications. Some exemplary systems include: a home IoT security system; a smart grid and microgrid security system; security relating to Navy ships, military aircraft, and Department of Defense (DoD) systems; security of networked critical infrastructure, such as dams, hospitals, and transportation networks; and enterprise security for networks of computers, printers, and mobile devices. Examples of primary users include: operators of DoD systems; operators and system administrators of distributed system and enterprise networks; security and information technology (IT) administrators for medium-to-large enterprises; and any users of the above listed exemplary systems.

Thus, the improvements provide by the disclosed system apply to several technologies and technical fields, including but not limited to: security of networked components; configuration security; cyber-physical system security; balancing security and functionality of networked components in an IoT system; and machine data analytics.

Exemplary Distributed Computer System

Figure 7:
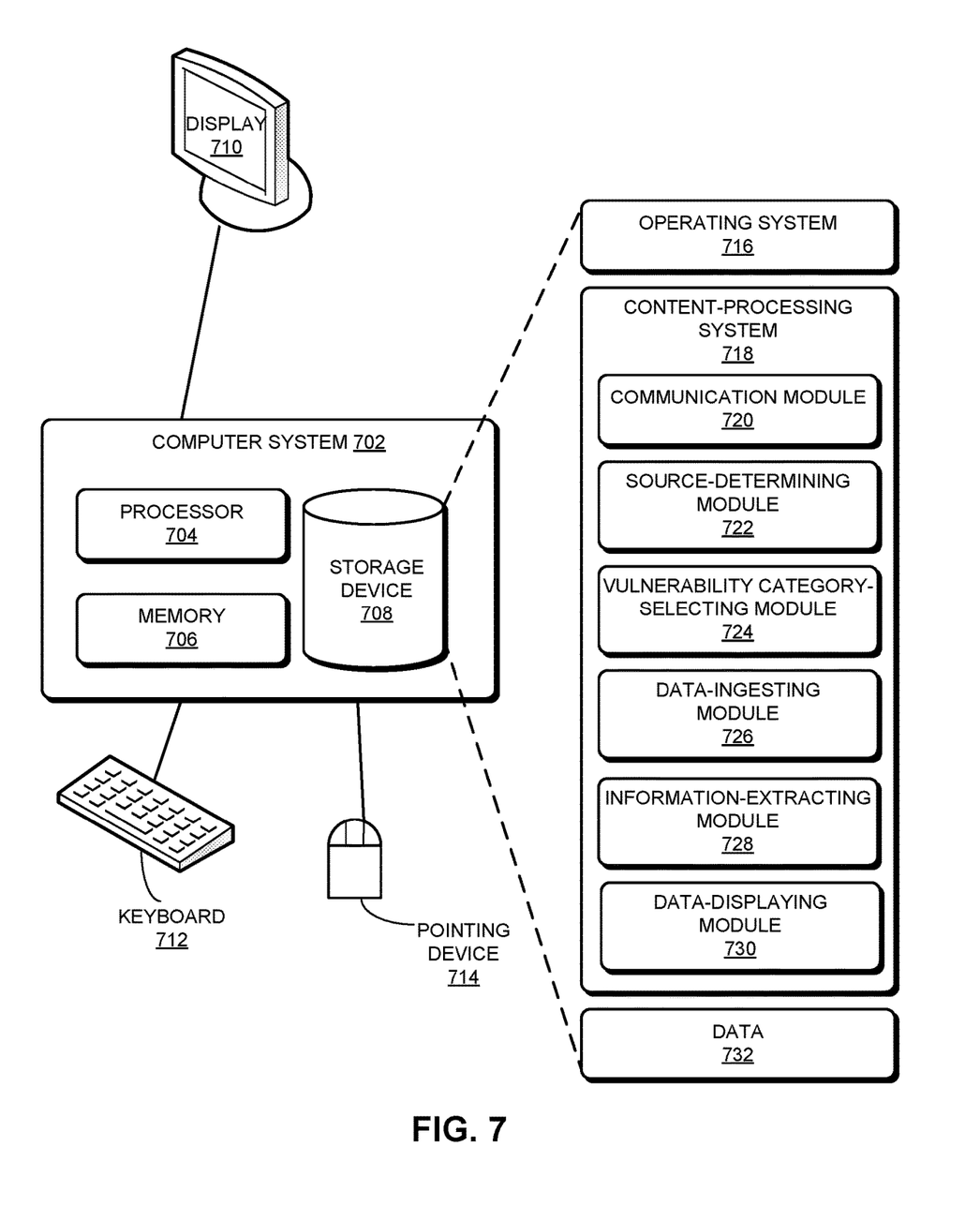
FIG. 7 illustrates an exemplary distributed computer and communication system that facilitates extraction of configuration-related information for reasoning about security and functionality of a composed system, in accordance with an embodiment of the present application.

FIG. 7 illustrates an exemplary distributed computer and communication system 702 that facilitates extraction of configuration-related information for reasoning about security and functionality of a composed system, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving/obtaining data packets to/from other network nodes across a computer network (communication module 720). A data packet can include a request, data, configuration information, vulnerability information, dependency information, functional requirements, and a command.

Content-processing system 718 can further include instructions for determining, by a computing device, information sources associated with hardware and software components of a system, wherein the information sources include at least specification sheets, standard operating procedures, user manuals, and vulnerability databases (source-determining module 722). Content-processing system 718 can include instructions for selecting a set of categories of vulnerabilities in a vulnerability database (vulnerability category-selecting module 724). Content-processing system 718 can include instructions for ingesting the information sources to obtain data in a normalized format (data-ingesting module 726). Content-processing system 718 can include instructions for extracting, from the ingested information sources, configuration information, vulnerability information, dependency information, and functionality requirements to create a model for the system (information-extracting module 722). Content-processing system 718 can include instructions for displaying, on a screen of a user device, one or more interactive elements which allow the user to view or select the information sources and the categories of vulnerabilities, initiate ingesting the information sources, and view the extracted configuration information (data-displaying module 730).

Data 732 can include any data that is required as input or that is generated as output by the methods and/or processes described in this disclosure. Specifically, data 732 can store at least: data; an identifier of an information source; an indicator or identifier of a hardware or software component of a system; a category; a selected set of categories of vulnerabilities; a normalized format for data; data in a first format prior to being normalized; data in a second format after being normalized; configuration information; vulnerability information; dependency information; functionality requirements; a model for a system; a multi-layer graph; a configuration graph; an attack or a vulnerability graph; a dependency graph; a security flag; a priority or setting which indicates a priority of security versus functionality for the system or one or more components of the system; a configuration parameter; a name of the configuration parameter; a data type associated with the configuration parameter; a default value associated with the configuration parameter; a current value associated with the configuration parameter; a range of possible values associated with the configuration parameter; a natural language text description associated with the configuration parameter; a relevancy metric; an analysis of a natural language text description; a relevant portion of a natural language text description; constraints, including equality constraints, inequality constraints, membership in a set, and ranges for the configuration parameter; a software vulnerability; a security bad practice; a security not-best practice; an indicator of expert knowledge; an entry; a CVE entry; a CWE identifier; user input; information associated with a third party tool; parameter range constraints; functionality and performance requirements; a weighted value; a default or other system setting; an indicator of an interactive element displayed on a graphical user interface of a computing device; a visual representation of a multi-layer graph, wherein the multi-layer graph comprises the configuration graph, a dependency graph, and a vulnerability graph; and a visualization of the selected set of categories of vulnerabilities.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   determining, by a computing device, information sources associated with hardware and software components of a system,
   wherein the information sources include at least specification sheets, standard operating procedures, user manuals, and vulnerability databases;
   selecting a set of categories of vulnerabilities in a vulnerability database;
   ingesting the information sources to obtain data in a normalized format;
   extracting, from the ingested information sources, configuration information, vulnerability information, dependency information, and functionality requirements to create a model for the system,
      wherein the system comprises an Internet of Things (IoT) system which comprises a configuration graph, an attack graph, and a dependency graph, and
      wherein the extracted configuration information is used to generate the configuration graph, the extracted vulnerability information is used to generate the vulnerability graph, and the extracted dependency information is used to generate the dependency graph; and
   displaying, on a screen of a user device, one or more interactive elements which allow the user to view or select the information sources and the categories of vulnerabilities, initiate ingesting the information sources, and view the extracted configuration information.

2. The method of claim 1, wherein the extracted configuration information includes, for a configuration parameter of a component of the system, one or more of:
a name of the configuration parameter;
a data type associated with the configuration parameter;
a default value associated with the configuration parameter;
a current value associated with the configuration parameter;
a range of possible values associated with the configuration parameter; and
a natural language text description associated with the configuration parameter.

3. The method of claim 2, further comprising:
analyzing the natural language text description associated with the configuration parameter, which involves:
determining, based on a relevancy metric, which portions of the natural language text description are relevant; and
determining from the relevant portions further constraints on the configuration parameters, wherein the constraints include one or more of:
equality constraints; inequality constraints; membership in a set; and
ranges for the configuration parameter.

4. The method of claim 1, wherein the extracted vulnerability information includes one or more of:
a first set of software vulnerabilities obtained from the vulnerability databases, wherein a category of vulnerabilities in the vulnerability database is associated with a type and a name, and wherein the selected categories are associated with configuration-related vulnerabilities;
a second set of security bad practices based on expert knowledge or specified by user input; and
a third set of security not-best practices based on expert knowledge or specified by user input.

5. The method of claim 4,
wherein the first set of software vulnerabilities include Common Vulnerability and Exposure (CVE) entries from the National Vulnerability Database, and
wherein a CVE entry of the first set is associated with a Common Weakness Enumeration Specification (CWE) identifier and is further categorized as a configuration-related vulnerability.

6. The method of claim 1, wherein the extracted dependency information includes one or more of:
input from the user or another user; and
a third party tool for discovering service dependencies based on observation of network traffic and analysis of call graph.

7. The method of claim 1, wherein the functionality requirements include one or more of:
parameter range constraints specifying legitimate ranges of values which can be assigned to a respective configuration parameter, wherein the parameter range constraints are obtained from the extracted configuration information; and
functionality and performance requirements ingested based on input from the user via a graphical interface on the screen of the user device.

8. The method of claim 1,
wherein the system includes a setting which prioritizes functionality or security, wherein the setting is passed to a reasoning module to determine whether a set of constraints associated with one or more of the components is mutually compatible.

9. The method of claim 8,
wherein the setting comprises a weighted value for a subset of one of more components, wherein the weighted value is assigned by the user or based on a default or other system setting.

10. The method of claim 1, wherein the one or more displayed interactive elements further allow the user to view one or more of:
the extracted vulnerability information;
the extracted dependency information; and
the extracted functionality requirements.

11. A computer system, the system comprising:
a processor; and
a storage device storing instructions that when executed by the processor cause the processor to perform a method, the method comprising:
determining, by a computing device, information sources associated with hardware and software components of a system,
wherein the information sources include at least specification sheets, standard operating procedures, user manuals, and vulnerability databases;
selecting a set of categories of vulnerabilities in a vulnerability database;
ingesting the information sources to obtain data in a normalized format;
extracting, from the ingested information sources, configuration information, vulnerability information, dependency information, and functionality requirements to create a model for the system,
wherein the system comprises an Internet of Things (IoT) system which comprises a configuration graph, an attack graph, and a dependency graph, and
wherein the extracted configuration information is used to generate the configuration graph, the extracted vulnerability information is used to generate the vulnerability graph, and the extracted dependency information is used to generate the dependency graph; and
displaying, on a screen of a user device, one or more interactive elements which allow the user to view or select the information sources and the categories of vulnerabilities, initiate ingesting the information sources, and view the extracted configuration information.

12. The computer system of claim 11, wherein the extracted configuration information includes, for a configuration parameter of a component of the system, one or more of:
a name of the configuration parameter;
a data type associated with the configuration parameter;
a default value associated with the configuration parameter;
a current value associated with the configuration parameter;
a range of possible values associated with the configuration parameter; and
a natural language text description associated with the configuration parameter.

13. The computer system of claim 12, wherein the method further comprises:
analyzing the natural language text description associated with the configuration parameter, which involves:

determining, based on a relevancy metric, which portions of the natural language text description are relevant; and determining from the relevant portions further constraints on the configuration parameters, wherein the constraints include one or more of:

equality constraints; inequality constraints; membership in a set; and ranges for the configuration parameter.

14. The computer system of claim 11, wherein the extracted vulnerability information includes one or more of:

a first set of software vulnerabilities obtained from the vulnerability databases, wherein a category of vulnerabilities in the vulnerability database is associated with a type and a name, and wherein the selected categories are associated with configuration-related vulnerabilities;

a second set of security bad practices based on expert knowledge or specified by user input; and a third set of security not-best practices based on expert knowledge or specified by user input, wherein the first set of software vulnerabilities include Common Vulnerability and Exposure (CVE) entries from the National Vulnerability Database, and wherein a CVE entry of the first set is associated with a Common Weakness Enumeration Specification (CWE) identifier and is further categorized as a configuration-related vulnerability.

15. The computer system of claim 11, wherein the functionality requirements include one or more of:

parameter range constraints specifying legitimate ranges of values which can be assigned to a respective configuration parameter, wherein the parameter range constraints are obtained from the extracted configuration information; and functionality and performance requirements ingested based on input from the user via a graphical interface on the screen of the user device.

16. The computer system of claim 11, wherein the system includes a setting which prioritizes functionality or security, wherein the setting is passed to a reasoning module to determine whether a set of constraints associated with one or more of the components is mutually compatible.

17. The computer system of claim 11, wherein the one or more displayed interactive elements further allow the user to view one or more of:

the extracted vulnerability information;

the extracted dependency information; and the extracted functionality requirements.

18. A non-transitory computer-readable storage medium storing instructions that when executed by a computer cause the computer to perform a method, the method comprising:

determining, by a computing device, information sources associated with hardware and software components of a system, wherein the information sources include at least specification sheets, standard operating procedures, user manuals, and vulnerability databases;

selecting a set of categories of vulnerabilities in a vulnerability database;

ingesting the information sources to obtain data in a normalized format;

extracting, from the ingested information sources, configuration information, vulnerability information, dependency information, and functionality requirements to create a model for the system, wherein the system comprises an Internet of Things (IoT) system which comprises a configuration graph, an attack graph, and a dependency graph, and wherein the extracted configuration information is used to generate the configuration graph, the extracted vulnerability information is used to generate the vulnerability graph, and the extracted dependency information is used to generate the dependency graph; and displaying, on a screen of a user device, one or more interactive elements which allow the user to view or select the information sources and the categories of vulnerabilities, initiate ingesting the information sources, and view the extracted configuration information.

* * * * *